United States Patent
Hahn et al.

(10) Patent No.: US 11,192,643 B2
(45) Date of Patent: Dec. 7, 2021

(54) METHOD FOR PREDICTING VIBRATIONS OF AN AIRCRAFT

(71) Applicant: ZF Friedrichshafen AG, Friedrichshafen (DE)

(72) Inventors: Steffen Hahn, Hann. Münden (DE); Andre Hausberg, Kassel (DE)

(73) Assignee: ZF Friedrichshafen AG, Friedrichshafen (DE)

(*) Notice: Subject to any disclaimer, the term of this patent is extended or adjusted under 35 U.S.C. 154(b) by 239 days.

(21) Appl. No.: 16/334,299

(22) PCT Filed: Aug. 3, 2017

(86) PCT No.: PCT/EP2017/069586
§ 371 (c)(1),
(2) Date: Mar. 18, 2019

(87) PCT Pub. No.: WO2018/054590
PCT Pub. Date: Mar. 29, 2018

(65) Prior Publication Data
US 2019/0233093 A1    Aug. 1, 2019

(30) Foreign Application Priority Data
Sep. 20, 2016 (DE) .......................... 102016218031.2

(51) Int. Cl.
*B64C 27/00* (2006.01)
*B64F 5/60* (2017.01)
(Continued)

(52) U.S. Cl.
CPC ............ *B64C 27/001* (2013.01); *B64D 45/00* (2013.01); *B64F 5/60* (2017.01); *G01H 1/006* (2013.01);
(Continued)

(58) Field of Classification Search
None
See application file for complete search history.

(56) References Cited

U.S. PATENT DOCUMENTS

| 5,383,133 A | 1/1995 | Staple |
| 7,017,857 B2 | 3/2006 | Hill et al. |

(Continued)

FOREIGN PATENT DOCUMENTS

CA    2752701 A1    9/2010

OTHER PUBLICATIONS

International Search Report and Written Opinion for PCT/EP2017/069586, dated Oct. 27, 2017.

*Primary Examiner* — Todd Melton
(74) *Attorney, Agent, or Firm* — Crowell & Moring LLP

(57) ABSTRACT

A method for predicting vibrations in an aircraft comprising an active vibration reduction system includes estimating a first vibration amplitude or frequency resulting from adjustments by the active vibration reduction system and the respective sensitivities of the aircraft depending on the flying state using a statistical mathematical process, recording a second vibration amplitude or frequency by a sensor, generating a pseudo-vibration profile by combining the first and second vibration amplitudes or frequencies, comparing the pseudo-vibration profile with a predefined target vibration profile, and outputting a signal when a specific threshold value has been exceeded.

2 Claims, 4 Drawing Sheets

(51) Int. Cl.
*B64D 45/00* (2006.01)
*G01H 1/00* (2006.01)
*G05D 19/02* (2006.01)
*G01M 7/00* (2006.01)
*G01M 5/00* (2006.01)

(52) U.S. Cl.
CPC ............ *G01M 5/0066* (2013.01); *G01M 7/00* (2013.01); *G05D 19/02* (2013.01); *B64C 2027/004* (2013.01); *B64D 2045/0085* (2013.01)

(56) References Cited

U.S. PATENT DOCUMENTS

| | | | |
|---|---|---|---|
| 9,027,873 B2 * | 5/2015 | Heverly, II | F16F 15/002 244/17.13 |
| 10,486,803 B2 * | 11/2019 | Black | G01M 5/0066 |
| 2015/0028152 A1 | 1/2015 | Eller et al. | |

* cited by examiner

METHOD FOR PREDICTING VIBRATIONS OF AN AIRCRAFT

RELATED APPLICATIONS

This application claims the benefit under 35 U.S.C. § 371 of the filing date of International Patent Application No. PCT/EP2017/069586, having an international filing date of Aug. 3, 2017, which claims priority to German Application No. 10 2016 218 031.2, filed Sep. 20, 2016, the contents of both of which are incorporated herein by reference in their entirety.

The invention relates to a method for predicting vibrations in an aircraft, in particular a rotocraft, wherein the aircraft has active systems for reducing main and/or tail rotor vibrations.

It is known from the prior art that the amplitudes and phases of the rotor-harmonic vibrations change in the cabin of the aircraft depending on the flying state.

It is also known that the amplitudes and phases of the rotor-harmonic vibrations in the cabin of the aircraft change depending on the configuration of the aircraft, e.g. the weight, the center of gravity, etc.

It is likewise known that damage to the main and/or tail rotors, resulting in a change in the weight of the rotor blades or a change in the aerodynamic properties of the rotors, changes the amplitudes and phases of the rotor-harmonic vibrations in the cabin of the aircraft.

According to the current prior art, models for predicting vibrations can be generated from predicted characteristics in conjunction with reference measurements. Current HUM systems (Health and Usage Monitoring systems) are able to detect damage to the main and/or tail rotors through the comparison of the predicted and the measured vibrations. HUM systems are described, e.g., in GB8915406 and US 20140070153A1.

Active oscillation isolation systems, also referred to as "active systems," have been used for some time to reduce oscillations and/or vibrations. An active system is, in particular, the individual blade control (IBC) system, in particular a control rod that can be adjusted electrically, or a trim tab on the rotor blade, or a high harmonic control (HHC) system. Both systems cause a change in the existing and/or generated forces and/or torques applied to the rotor with the same amplitudes as, but opposing phases to, the original forces and/or torques. The interaction may result in a counteractive interference, such that vibrations induced by the rotors can be reduced and ideally eliminated. In other words, the rotor blades are controlled at higher frequencies such that the undesired vibrational forces are eliminated a much as possible. Control rods that can be adjusted electrically in terms of length are known from DE101009001393A1 and DE102012206755A1, etc.

If a rotocraft has an active system for reducing oscillations and/or vibrations, in particular in the main and/or tail rotors, then the principle for detecting malfunctions described above can no longer be applied, because the active systems are able to mask the changes in vibrations caused by damage to the rotors.

The object of the invention is therefore to provide a method that detects vibrations caused by damage to the main and/or tail rotors of an aircraft, for example, when the aircraft has an active system for reducing vibrations.

This problem is solved according to the invention by a method for predicting vibrations in an aircraft in which the aircraft comprises active systems for reducing vibrations in the main and/or tail rotors, in particular length-adjustable control rods and/or trim tabs, wherein the method comprises the steps:

estimating the first vibrations, in particular delta or difference vibrations, resulting from adjustments by the active system for actively reducing vibrations and the respective sensitivities of the aircraft depending on the flying state, by means of a statistical mathematical method in a first step 110 at a first point in time t1;

recording the second vibration by means of at least one sensor in a second step 120 at a second point in time t2;

generating a pseudo-vibration profile by means of the first vibrations and the second vibrations in a third step 130 at a third point in time t3;

comparing the pseudo-vibration profile with a predefined target vibration profile of the aircraft in a fourth step 140 at a fourth point in time t4;

outputting a signal when a specific threshold value has been exceeded in a fifth step 150 at a fifth point in time t5, wherein t1 is less than, greater than, or equal to t2, which is less than t3, which is less than t4, which is less than t5.

Vibrations are periodic mechanical oscillations, usually of a medium or higher frequency and with low amplitudes.

The first vibrations, also referred to as delta vibrations, which have first amplitudes and corresponding first frequencies, can be determined from adjustments made by the active system for actively reducing and/or suppressing vibrations and the respective sensitivities depending on the flying state. Numerical procedures known to the person skilled in the art can be used for this. An "adjustment by the active system to actively reduce vibrations" refers to a measure in general for actively reducing oscillations and/or vibrations, e.g. a length adjustment of an adjustable control rod or an adjustment to a trim tab.

"Sensitivity" refers to a change in a target function resulting from a slight change in an input value, known and familiar to the person skilled in the art. Through sensitivity analyses, it is possible to determine the extent to which changes to the input conditions can affect a result, i.e. how sensitively an aircraft will react.

The second vibrations, comprising second amplitudes and corresponding second frequencies, can be detected by means of one or more sensors that can be located in both the rotating system as well as the non-rotating system (cabin).

A flying state is a flying maneuver, in particular, such as a descent, ascent, autorotation, curve, hovering, forward flight, etc.

It has been shown that the current vibrational state can be predicted with the method according to the invention, without active vibration reduction, from the measured vibrations, i.e. the second amplitudes and second frequencies, and the delta vibrations that are generated, i.e. the first amplitudes and frequencies.

In a preferred embodiment, the output signal is an acoustic and/or haptic and/or visual signal. As a result, an aircraft pilot can already be notified of possible damages during the flight.

The present invention shall be explained in greater detail based on the following figures. Therein:

Figure 1:
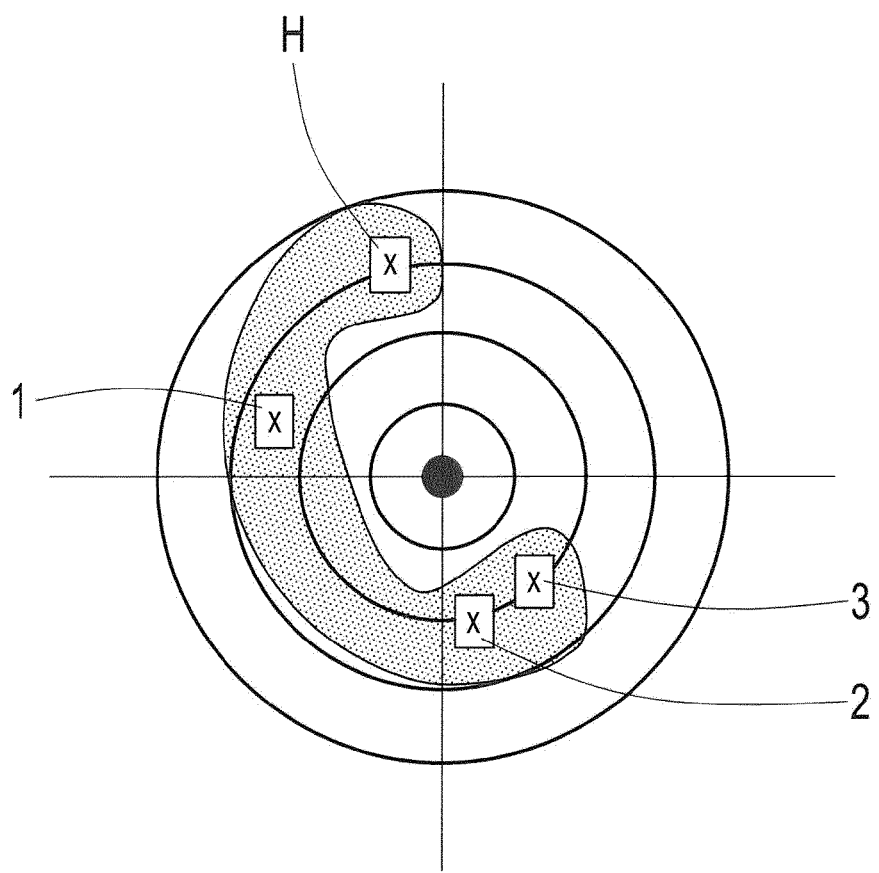
FIG. 1 shows a profile of the 1/rev main rotor vibrations of an undamaged aircraft in various flying states, without active vibration reduction.
Figure 2:
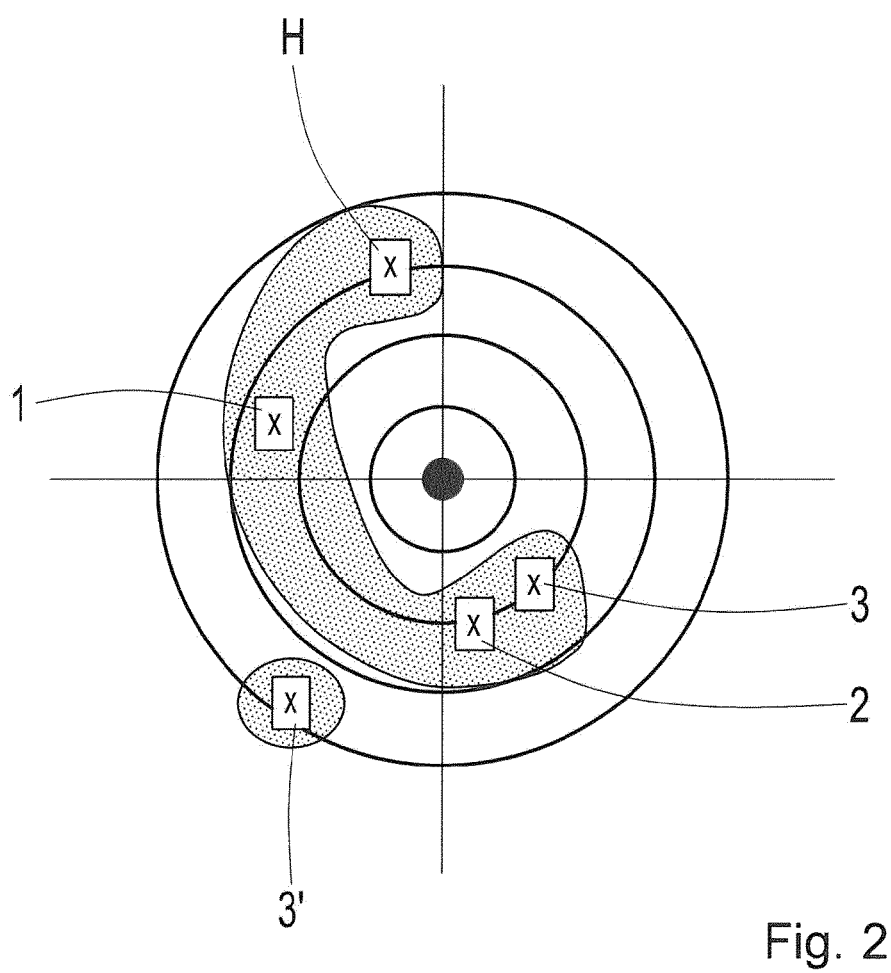
FIG. 2 shows a profile of the 1/rev main rotor vibrations of a damaged main rotor in accordance with FIG. 1.
Figure 3:
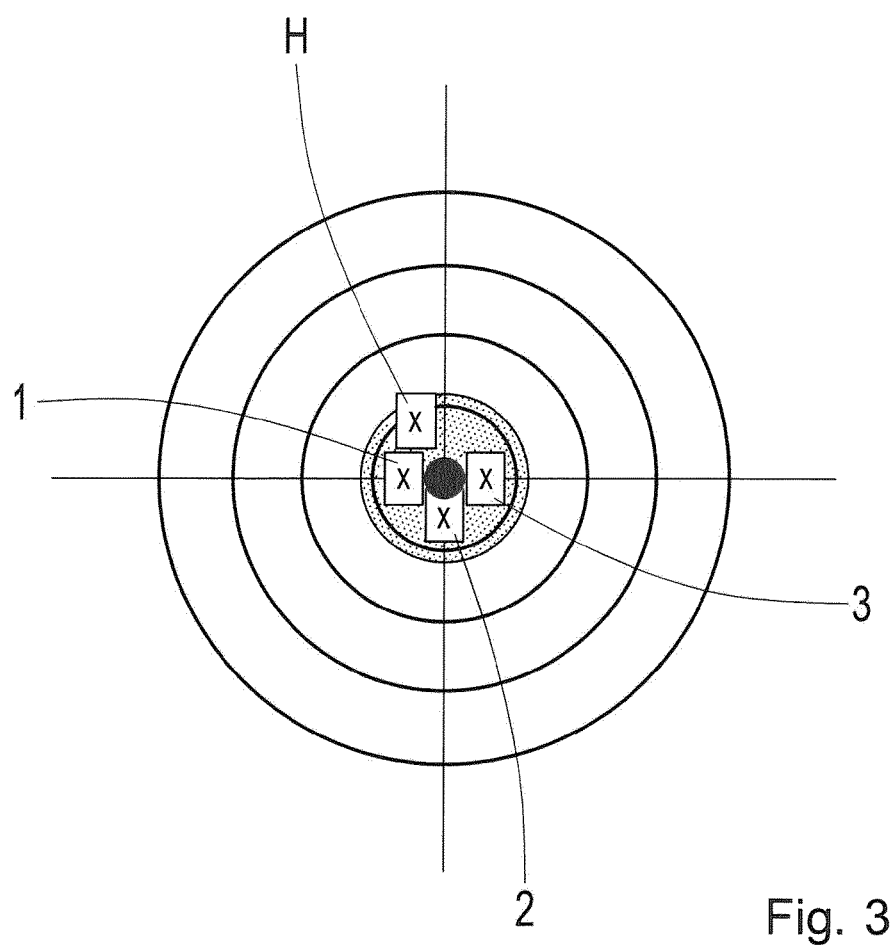
FIG. 3 shows a profile of the 1/rev main rotor vibrations of an undamaged aircraft in various flying states, with active vibration reduction.

FIGS. 1 to 3 describe the prior art, and are provided for a better understanding of the present invention.

As such, FIG. 1 shows a characteristic vibration profile, in the form of a polar diagram, of the 1/rev main rotor vibrations of an undamaged, i.e. an intact rotorcraft in the form of a conventional helicopter with main and tail rotors without an active vibration reduction system. The points 1, 2, 3 and H represent reference measurements of the vibrations in various flying states, wherein the transitions between the individual measurement points is interpolated linearly. Thus, point H represents a hovering, point 1 represents forward flight at 90 knots, point 2 represents forward flight at 110 knots, and point 3 represents forward flight at 130 knots. The crosshatched region indicates a corridor representing a "normal" operating range of the undamaged aircraft in hover and forward flight, but not in flying maneuvers.

FIG. 2 shows, by way of example, the resulting vibrations 3' of a damaged main rotor in level flight at 130 knots for an aircraft without active vibration reduction. These malfunctions can be detected by current Health and Usage Monitoring Systems (HUMS).

A vibration profile for a helicopter with an active system is shown in FIG. 3. When an active system is used for vibration reduction, the amplitudes of the rotor-harmonic vibrations are normally low in all flying states. Moreover, the vibrations of the undamaged aircraft no longer display a characteristic phase, as is the case with rotorcraft that have no active system for vibration reduction.

Active systems for vibration reduction are normally also capable of minimizing the vibrations in damaged main or tail rotors, such that no difference can be detected between undamaged and damaged rotocraft with regard to vibrations.

Figure 4:
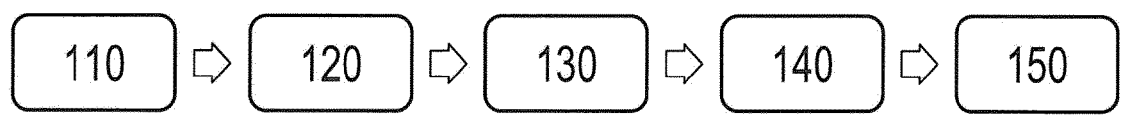
FIG. 4 shows a method according to the invention in a preferred embodiment.

FIG. 4 shows the method according to the invention for solving this problem.

In a first step 110, the first vibrations, i.e. the first amplitudes or frequencies, are determined or estimated by means of a statistical mathematical procedure at a first point in time t1. These vibrations result from adjustments by the active system for active vibration reduction and the sensitivities of the rotocraft depending on flying states. The flying state-dependent sensitivities are determined by means of model calculations and flight tests.

In a second step 120, at a second point in time t2, second vibrations, i.e. second amplitudes or second frequencies are recorded by sensors.

Both vibrations, i.e. the estimated first vibrations and the second measured vibrations are combined to form a pseudo vibration profile in a third step 130 at a third point in time t3, and compared with a target vibration profile in a fourth step 140 at a fourth point in time t4.

The target vibration profile is determined by means of model calculations and flight tests.

When a specific threshold of the vibration profile has been reached and/or exceeded, a signal is generated and output in a fifth step 150 at a fifth point in time. The signal can be output acoustically or visually, for example.

The invention claimed is:

1. A method for predicting vibrations in an aircraft, wherein the aircraft comprises an active vibration reduction system for reducing vibrations in at least one of a main rotor or a tail rotor, wherein the method comprises:
    at a first point in time t1, determining a current adjustment by the active vibration reduction system and a respective flying state-dependent sensitivity of the aircraft, and estimating a first vibration amplitude or frequency by executing a statistical mathematical process, wherein the first vibration amplitude or frequency comprises an estimated delta vibration that is reduced as a result of the current adjustment by the active vibration reduction system and the respective flying state-dependent sensitivity of the aircraft;
    recording a second vibration amplitude or frequency by means of at least one sensor at a second point in time t2;
    generating a pseudo vibration profile by combining the first vibration amplitude or frequency and the second vibration amplitude or frequency at a third point in time t3 occurring after t2, wherein the pseudo vibration profile comprises an estimation of a vibration profile that would exist if the active vibration reduction system was inactive;
    comparing the pseudo vibration profile with a predefined target vibration profile of the aircraft at a fourth point in time t4 occurring after t3; and
    outputting a signal when a specific threshold value of the target vibration profile has been exceeded by the pseudo vibration profile at a fifth point in time t5 occurring after t4.

2. The method according to claim 1, wherein in that the output signal comprises at least one of an acoustic, haptic, or visual signal.

* * * * *